United States Patent [19]
Shibata

[11] Patent Number: 5,435,500
[45] Date of Patent: Jul. 25, 1995

[54] PHOTOGRAPHIC FILM CASSETTE

[75] Inventor: Tadayoshi Shibata, Kanagawa, Japan

[73] Assignee: Fuji Photo Film Co., Ltd., Kanagawa, Japan

[21] Appl. No.: 147,566

[22] Filed: Nov. 5, 1993

[30] Foreign Application Priority Data

Nov. 6, 1992 [JP] Japan .................................. 4-297467

[51] Int. Cl.⁶ ............................................. G03B 17/26
[52] U.S. Cl. .................................. 242/348.4; 354/275; 430/501; 430/533
[58] Field of Search ................... 242/348, 348.2, 348.3, 242/348.4; 354/275; 430/533, 495, 501

[56] References Cited

U.S. PATENT DOCUMENTS

| | | | |
|---|---|---|---|
| 4,141,735 | 2/1979 | Schrader et al. | 430/533 |
| 4,832,275 | 5/1989 | Robertson . | |
| 4,834,306 | 5/1989 | Robertson et al. . | |
| 5,057,403 | 10/1991 | Kume et al. | 430/501 |
| 5,112,003 | 5/1992 | Covington et al. | 242/348.4 |
| 5,213,277 | 5/1993 | Takahashi et al. . | |
| 5,234,176 | 8/1993 | Mizuno | 242/348.4 |
| 5,288,601 | 2/1994 | Greener et al. | 430/533 |
| 5,326,689 | 7/1994 | Murayama | 430/533 |
| 5,332,168 | 7/1994 | Shibata et al. | 242/348.3 |

Primary Examiner—John M. Jillions
Attorney, Agent, or Firm—Sughrue, Mion, Zinn, Macpeak & Seas

[57] ABSTRACT

A photo film cassette contains a spool rotatably, on which photo film is wound as a roll with a leading end wound on the outside. A cassette shell has a passage port, through which the photo film is passed. A single separating claw is disposed in an inner position in the passage port, separates the leading end from the photo film roll during rotation of the spool to unwind the photo film, and exits the leading end through the passage port. The claw is so positioned as to avoid contact with a second outermost turn of the photo film roll. The photo film includes support material, which supports a photosensitive emulsion layer, and has reliably high stiffness, which remains sufficient even under excessively high humidity. The support material is of stiff resinous film which can have a small thickness from 40 to 100 μm. A trailing end of the photo film is secured to the spool. Ridges are formed along two lengthwise edges of the photo film and in a partial range within a trailer, and stiffen the photo film. Likewise, embossed patterns are disposed on a trailer, and reduce friction between turns of the photo film wound as roll.

4 Claims, 6 Drawing Sheets

PHOTOGRAPHIC FILM CASSETTE

BACKGROUND OF THE INVENTION

1. Field of the Invention

The present invention relates to a photographic film cassette. More particularly, the present invention relates to a photographic film cassette an entire roll including a leading end of photographic film is contained in a cassette shell, and rotation of a spool causes the leading end to advance to the outside.

2. Description Related to the Prior Art

In a conventional photographic film cassette containing 135 photographic film, a leading end of photographic film is protruded from inside a cassette shell even before use of the photographic film. To load a camera with the cassette, a user is required to handle it with while paying attention not only to the cassette shell but to the protruded leading end. To overcome this difficulty of the conventional photographic film cassette at the time of inserting it into a camera, it has been proposed to utilize a cassette in which a leading end of photographic film is initially contained in a cassette shell, and rotation of a spool causes the leading end to advance to the outside, as disclosed in U.S. Pat. Nos. 4,832,275 and 4,834,306 and a commonly assigned U.S. Pat. No. 5,213,277.

Figure 12:
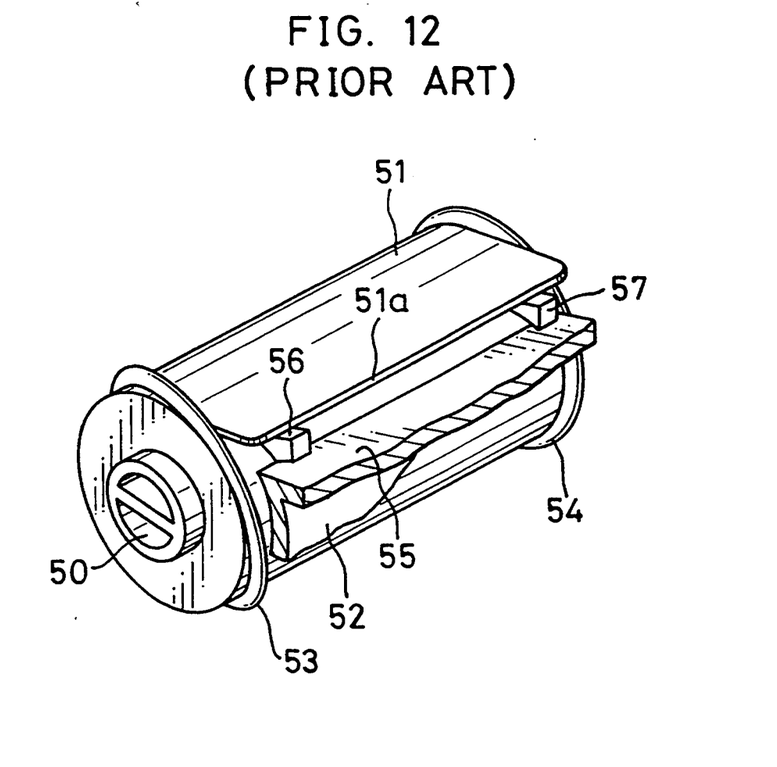
FIG. 12 is an explanatory view illustrating a structure of a photo film cassette according to prior art.

FIG. 12 illustrates the device disclosed in in U.S. Pat. No. 4,832,275. A cassette shell 52 (partially shown) contains a spool 50 rotatably. Photo film 51 is Wound on the spool 50 and forms a photo film roll. There are a pair of roll-regulating rings 53 and 54 disposed around the outermost turn of the roll and slanted relative to the roll, so as to prevent the roll from loosening. The rings 53 and 54 spread in a passage port 55 having a port mouth (not shown), so that a leading end 51a of the photo film 51 is passed between the rings 53 and 54. The rings 53 and 54 are rotatably received in annular grooves formed in an inner cylindrical face of the cassette shell 52 in slant orientations. A pair of separating claws 56 and 57 are formed integrally with the passage port 55 to be in contact with the outermost turn of the roll.

Upon a start of rotating the spool 50 in the unwinding direction, the roll, if there is a small gap between the roll and the rings 53 and 54, may come to loosen to a small extent, but is at once stopped from loosening by the rings 53 and 54 in course of the rotation of the spool 50. The roll and the rings 53 and 54 are rotated together with the spool 50. The leading end 51a comes near to the passage port 55, is separated by the separating claws 56 and 57 from the roll, and exited from out of the cassette shell 52 through the passage port 55.

The roll-regulating rings 53 and 54 are replaced, according to U.S. Pat. No. 5,213,277, with a pair of annular ridges formed on an inner cylindrical face of the cassette shell. Any constructions structures of such leader-advancing photo film cassettes, such as disclosed in relevant prior documents, commonly require a structure for separating the leading end from the roll of the photo film, while coming in contact with the outermost turn of the roll However the known separating claws have a low reliability of success in separation of a leading end from the roll. This arises from difficulties in manufacturing the photo film while keeping the thickness of the photo film uniform with great precision.

It is frequent that there are minute changes in amounts of emulsion for application to the photo film, and changes in thickness of a support material being manufactured. There thus rises a substantial difference in photo film between the estimated entire thickness and an actual entire thickness. Such a difference can amount to over 5% of the estimated entire thickness. Should a separating claw be formed in a somewhat large size with an estimation that the photo film may have a small thickness, there would be a problem in that the separating claw would scratch a roll of photo film having a larger thickness unexpectedly.

It can be also pointed out that, if a separating claw is formed in a somewhat small size with an estimation that the photo film may have a large thickness, there is a problem in that a roll of photo film having a smaller thickness unexpectedly does not come in contact with the separating claw.

Severe environment also influences-the performance of the claw in separating the leading end. When the roll of the photo film contained in the cassette shell is kept at high temperature or high humidity, the turns of the roll are tightened to have a small diameter irrecoverably. There are occasions on which the small roll of the photo film does not come in contact with the separating claw, for example in a hot condition of 80° C. inside an automobile subjected to daylight in midsummer, or in a dry condition of 15% RH or below Long preservation of the roll of the photo film contained in the cassette shell further influences the roll by tightening the turns to have a small diameter. The roll is given a tendency to curl irrecoverably in the entire length o#the film. It is difficult or impossible for the small roll of the photo film to come in contact with the separating claw. Should the leading end be exited successfully, it would be highly difficult to keep the film flat within a camera loaded With the photo film.

There is an occasion on which, when a camera is loaded with the cassette, the photo film fails to move for initial transportation within the camera. The camera has an exposure aperture for effecting exposure, and a back lid having a pressure plate behind the exposure aperture. The pressure plate supports the photo film on the rear of an exposure aperture. A thin space, defined between the exposure aperture and the pressure plate for passage of the photo film, is as thin as 0.2 mm for the purpose of flattening the photo film within the camera. In use of the leader-advancing cassette, the photo film having been exited from the cassette may fail to be inserted into the passage space. There is a fear that the leading end might come in contact with a wall, be flex back by the wall, and fail to advance further.

Under conditions of high relative humidity of 80% RH, stiffness, namely characteristic resistant to deformation, of photo film is lowered remarkably. There are occasions in which turns of the photo film roll, lying one over another while wound on a spool, are stuck together nearly inseparably, in particular under an increase in friction between turns of the roll, and after long preservation under high humidity. When the turns of the photo film absorb a great deal of moisture, they may be thickened to increase the diameter of the roll inside a cassette shell, until it becomes difficult or impossible to rotate the roll of the film relative to the cassette shell. This causes difficulties in rotating a spool of the leader-advancing cassette. Should a rotational torque be applied to the spool, the roll while kept nearly immovable within the cassette shell would concentrate application of rotational load upon a trailer of the photo film secured to the spool. Increase of such load on the trailer would flex the trailer in the direction reverse to the turns of the roll, and prevents the trailer from transmitting the rotation of the spool to the roll. It follows that there are drawbacks in known leader-advancing cassettes in reliability of outward advancement of the leading end.

SUMMARY OF THE INVENTION

In view of the foregoing problems, an object of the present invention is to provide a leader-advancing photo film cassette in which a leading end can be reliably separated from a photo film roll.

Another object of the present invention is to provide a leader-advancing photo film cassette in which a trailer of photo film can reliably transmit rotation of a spool to a photo film roll without reverse flexure.

A further object of the present invention is to provide a leader-advancing photo film cassette in which turns of a photo film roll are prevented from being stuck together inseparably.

Still another object of the present invention is to provide a leader-advancing photo film cassette in which photo film is prevented from curling irrecoverably.

An additional object of the present invention is to provide a leader-advancing photo film cassette in which a length of photo film to be contained in a cassette shell can be increased.

In order to achieve the above and other objects and advantages of this invention, a passage port is formed in the cassette shell for passage of the photo film. A single separating means is disposed in an inner position of the passage port for separating the leading end from the photo film roll in course of rotation of the spool in a direction of unwinding the photo film so as to exit the leading end through the passage port. The separating means is so positioned as to avoid contact with a second outermost turn of the photo film roll. The leading end can thus be reliably separated from the photo film roll.

The photo film includes at least one photosensitive emulsion layer. Support material supports the photosensitive emulsion layer, and has loop stiffness of at least 24 grams as measured under a condition of temperature of 32° C. and humidity of 85% RH, where the loop stiffness is load applied to a loop of a sample strip having a predetermined width until the loop is pressed down to a predetermined amount, the loop is formed by looping the strip held while overlaying together two portions of one surface of the strip, the load directed to the two overlaid portions. A trailer of the photo film having the sufficient stiffness can reliably transmit rotation of the spool to the photo film roll without reverse flexure.

The support material is made of polyester having a glass transition temperature which is from 85° to 200° C. and a thickness which is from 40 to 100 μm, and which is thermally treated at a temperature between 50° C. and the glass transition temperature. The photo film is thus prevented from curling irrecoverably. A length of the photo film to be contained in a cassette shell can be increased because of the reduced thickness.

A trailing end is defined on the photo film and secured to the spool. Means for stiffening the photo film is disposed at least on two lengthwise edges of the photo film and in a range between positions of 50 mm and 200 mm from the trailing end. A trailer of the photo film can thus reliably transmit rotation of the spool to the photo film roll without reverse flexure.

Means for reducing friction between surfaces of the photo film when wound on the spool is disposed at least on two lengthwise edges of the photo film and in a range between positions of 50 mm and 200 mm from the trailing end. Turns of the photo film roll are thus prevented from being stuck together inseparably.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS OF THE PRESENT INVENTION

Figure 1:
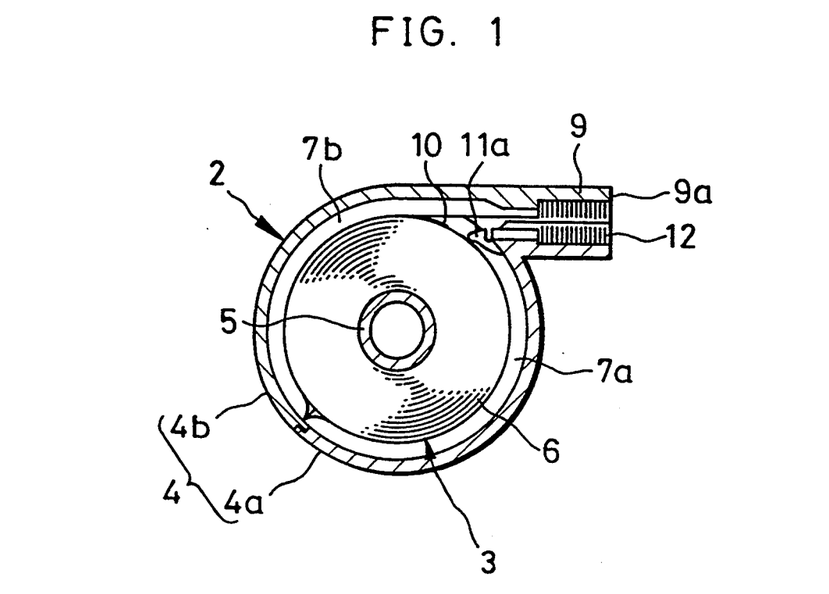
FIG. 1 is a cross section illustrating a photo film cassette according to the present invention.
Figure 2:
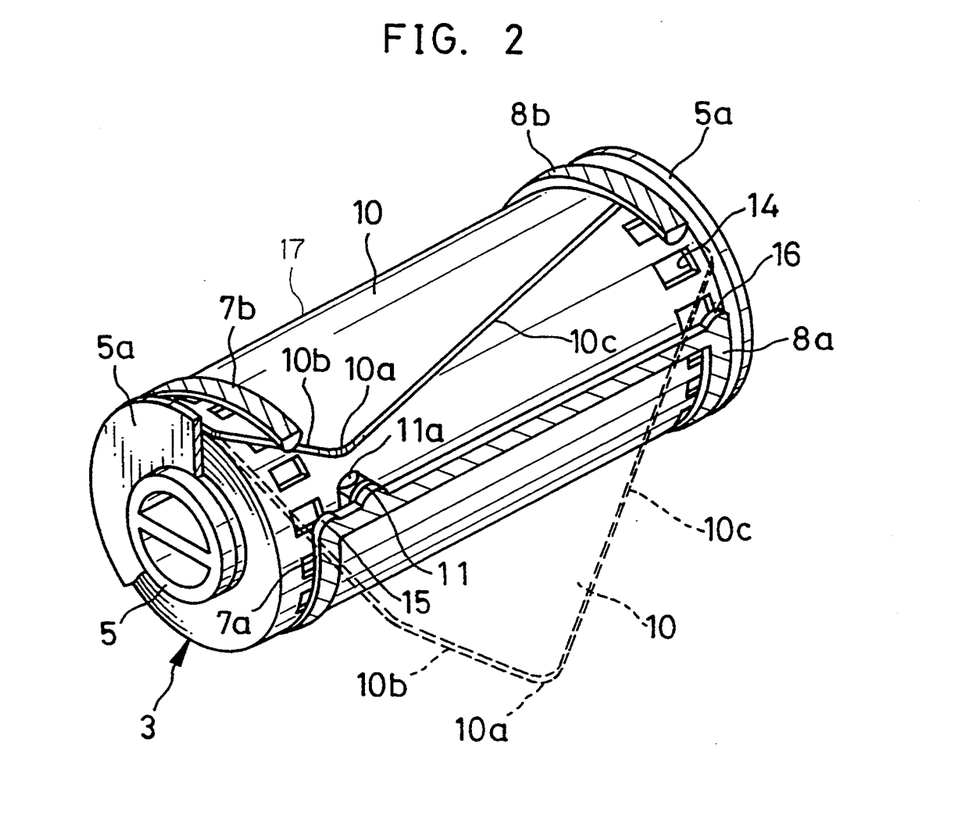
FIG. 2 is a perspective view illustrating a photo film roll contained in the cassette of FIG. 1, together with roll-regulating ridges.

FIGS. 1 and 2 illustrate a photo film cassette 2, which is constituted of a roll 3 of photo film 6, a cassette shell 4 and a plastic spool 5. The cassette shell 4 is opaque thus shielding the inside thereof from light. The spool 5 is rotatably contained in the cassette shell 4, and has the photo film 6 wound thereabout to form the roll 3. The photo film 6 is of the 135 type, and when wound is disposed neatly between two flanges 5a of the spool 5 (see FIG. 2). A trailing end (see FIG. 7) of the photo film 6 is secured to the spool 5. The cassette shell 4 is constituted of two shell halves 4a and 4b, which are separately molded, and after insertion of the spool 5 with the roll 3, are joined together.

The inside of the cassette shell 4 has two pairs of arcuate ridges 7a, 7b, 8a and 8b formed integrally. The arcuate ridges are in contact with an outermost turn 17 of the roll 3 while a diameter of the roll 3 is maximum, and thus prevent the roll 3 from loosening around the spool 5. In the cassette shell 4 is formed a passage port 9, which is open to the outside at a port mouth 9a, and communicates to a roll chamber inside the cassette shell 4. Inside the passage port 9 is formed a single port ridge 11, which is adapted to supporting a leader 10 of the photo film 6. In the passage port 9 is disposed plush or light-trapping ribbons 12 which block incident ambient light so as to prevent it from entry into the cassette shell 3.

Figure 3:
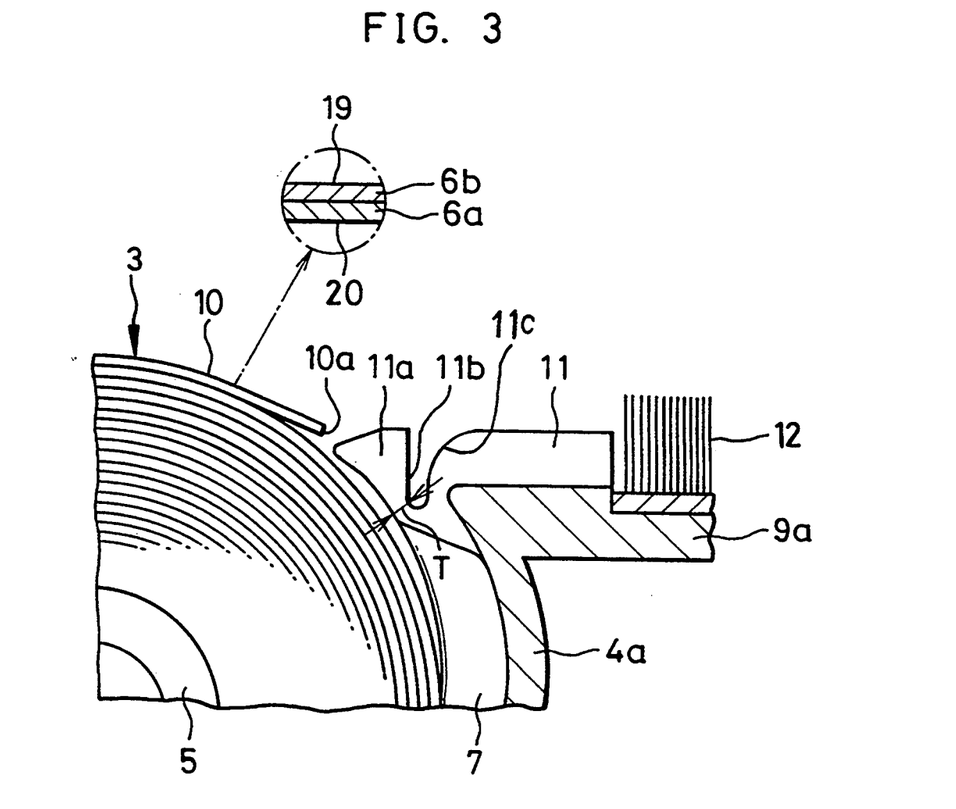
FIG. 3 is an explanatory view illustrating a port ridge and a separating claw, as related with the photo film roll.

A single leader-separating claw 11a is formed on the ridge 11, and located in correspondence with the outside of an imaging area 13 (see FIG. 5) defined by an exposure aperture of a camera, e.g. at a position facing the perforations 14. The separating claw 11a, while the roll 3 is rotated, is adapted to separating a leading end 10a of the film 6 from a second outermost turn 18 of the roll 3 (see FIGS. 3 and 4). The claw 11a has a witdh greater than a range of the perforations 14 so that the claw 11a is prevented from entry into the perforations 14. The arcuate ridges 7a and 8a are extended inside the passage port 9 to be port rails 15 and 16, which are adapted to be in contact with the photo film 6 to support it As illustrated in FIG. 3, a base portion of the claw 11a is provided with a groove 11b, and a bottom of the base portion is thin enough to give the claw 11a a resiliently flexible performance. The bottom under the groove 11b has a thickness T of 1.0 mm or less. The thickness T is preferably 0.9 to 0.2 mm, and further desirably 0.8 to 0.3 mm. The groove 11b keeps the claw 11a shiftable in a radial direction of the spool 5. In the course of rotation of the roll 3 with the spool 5 for the purpose of advancing the leading end 10a of the leader 10, the groove 11b operates by preventing the claw 11a from forcefully pressing the roll 3 while wound to be a maximum diameter, in order to protect the photo film 6 from being scratched. The groove 11b can have a small width for avoidance of entry of the leading end 10a. The groove 11b preferably can be formed with a sloped face 11c directed toward the port mouth 9a, in order to guide the leading end 10a smoothly toward the port mouth 9a even if the leading end 10a should enter the groove 11b.

Figure 4:
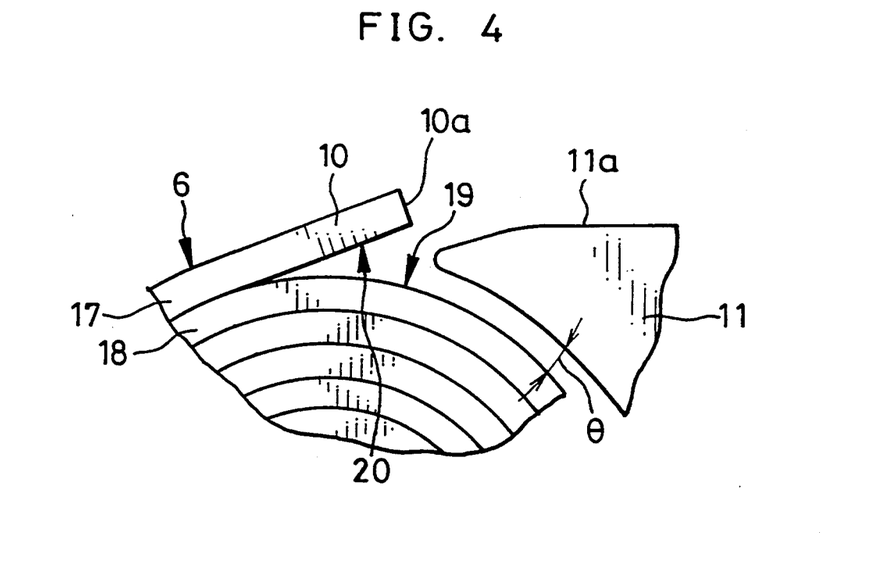
FIG. 4 is an explanatory view illustrating the separating claw, as related with a leading end of the photo film.

To enable the claw 11a to separate the leading end 10a from the second outermost turn 18 of the roll 3, the claw 11a is formed to have a radius of curvature from 0.02 to 0.5 mm, preferably from 0.04 mm up to half the thickness of the photo film 6. A tip of the claw 11a is coated with hard chrome plating, in order to prevent the film 6 from being scratched should the claw 11a come in contact with the photo film 6. As illustrated in FIG. 4, the tip of the claw 11a is kept slightly apart from the second outermost turn 18. A back surface 19 of the photo film 6 is thereby kept from contact with the claw 11a, so that no scratches are formed on the back surface 19. The tangent to a surface of claw 11a defines an angle $\theta$ with the second outermost turn 18. The angle $\theta$ is zero to 30 degrees, is preferably zero to 15 degrees, and is desirably equal to zero. The upper face of the claw 11a is slanted in order to facilitate movement of the photo film 6 after completion of separation of the leading end 10a. To protect an emulsion surface 20 from scratches, the claw 11a, the port ridge 11, the port rails 15 and 16 and the port mouth 9 are formed to have curvature for smooth and slippery contact with the emulsion surface 20.

Figure 5:
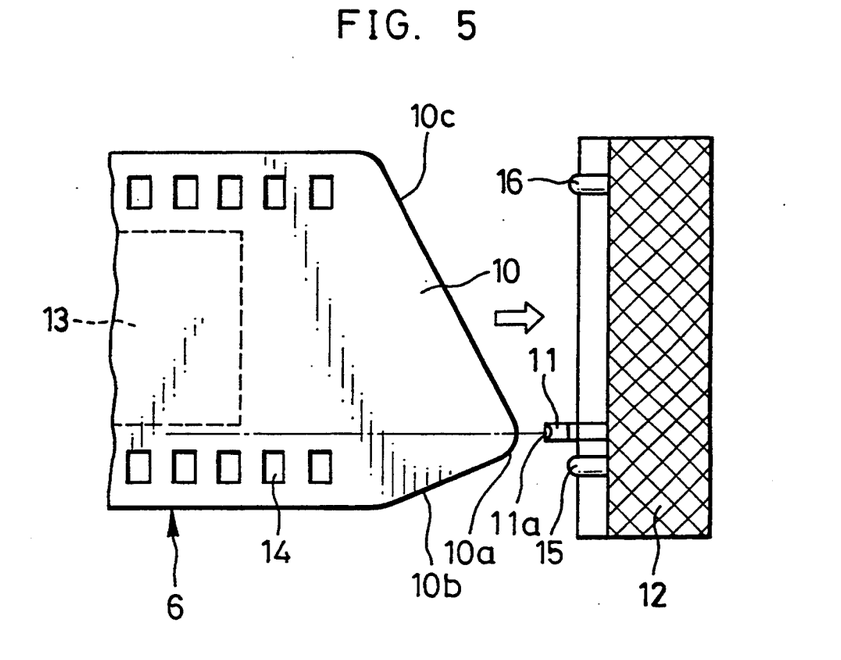
FIG. 5 is an explanatory view illustrating the leading end, as related with a photo film passage port.

The leader 10 of the photo film 6 is shaped as depicted in FIG. 5, in order that the leading end 10a can be reliably separated from the roll 3 even though the tip of the claw 11a is apart from the second outermost turn 18 of the roll 3. The length of slant edges 10b and 10c are unequal in the present invention, but may be equal. The width of the leader 10 decreases toward the leading end 10a, so that the leading end 10a has a loose tendency of not being stuck on the second outermost turn 18, is not regulated the ridges 7 and 8 and the spool flanges 5a.

Figure 6:
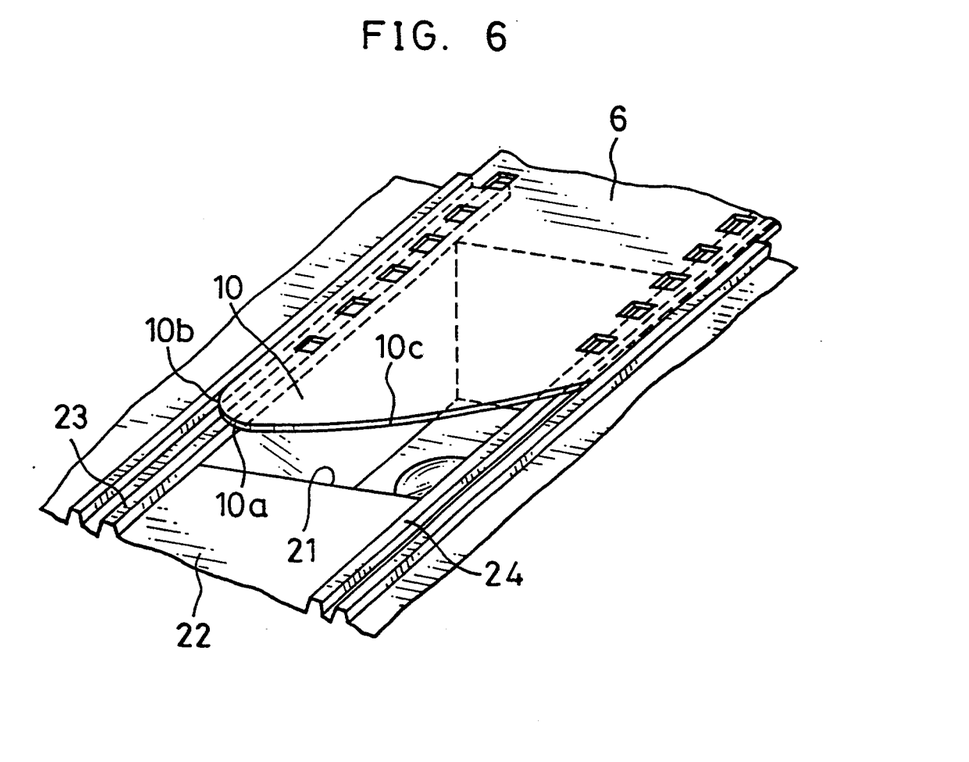
FIG. 6 is a perspective view illustrating the leading end while the photo film advanced on the rear of an exposure aperture of a camera.

The slant edges 10b and 10c have ranges, as viewed in the lengthwise direction of the photo film 6, over 5 mm and below 100 mm. Should they have ranges of 100 mm or more, the leader 10 would be so tapered that, while the photo film 6 would be transported inside a camera in the manner illustrated in FIG. 6, the leading end 10a would be accidentally entered into an exposure aperture 21 and the leader 10 would fail to move further and could not be engaged with a take-up spool of the camera. However, the slant edges 10b and 10c in the ranges below 100 mm prevent the leading end 10a from entry into the exposure aperture 21, and keeps the leader 10 on guiding rails 23 and 24 along the exposure aperture 21

Should the material for forming the photo film 6 be inappropriate, the leading end 10a would be inseparably stuck on the second outermost turn 18 of the roll 3, and that the trailer of the photo film 6, while the spool is rotated for advancing the leader 10 externally, would not transmit the rotation of the spool to the roll 3 but would be forcibly bent in the direction opposite to turns of the roll 3 under rotation of the spool. To solve such problems, the photo film 6 according to the present invention is constituted of support material 6b of polyethylene naphthalate (hereinafter referred to as PEN).

To manufacture the support material 6b, the PEN film is produced as polymer of polyester. The support material 6b can be finished by thermal treatment at the temperature which is at lowest 50 degrees Centigrade and at highest the glass transition temperature. The support material 6b after such thermal treatment has a stiff tendency and is not curled irrecoverably. The effect of thermal treatment would be lost in the support material 6b when it is subjected to the heat beyond the glass transition temperature. Therefore polyester having somewhat high glass transition temperature is preferable. Desirable polyester has glass transition temperature of at least 85 degrees, more preferably at least 90 degrees, taking into in consideration the temperature of 80 degrees as a hottest practical environment, e.g. a situation in an automobile under daylight in midsummer.

There is no general-purpose polyester which has a glass transition temperature beyond 200 degrees is transparent enough for use as photo film. It follows that polymer film for the photo film 6 to be used with the present invention can have the glass transition temperature between 85 and 200 degrees, more particularly at lowest 90 degrees.

Among polymers, polyester is preferable because thermal treatment below the glass transition temperature is effective for obtaining support material having a stiff tendency and little irrecoverable curling. Among polyester films, PEN produced from naphthalene dicarboxylic acid and ethylene glycol is preferable, because it is advantageous in good balance in mechanical intensity and tendency of having little irrecoverable curling. In particular, polyethylene-2,6-naphthalene dicarboxilate is preferable.

To use the PEN for the photo film 6, the support material 6b can preferably have a thickness of at least 40 $\mu$m. The support material 6b is thermally treated and then coated with photosensitive emulsion layers 6a. Should the support material have a thickness of 40 $\mu$m or less, the support material may not resist the stress caused in shrinkage while drying after coating of the emulsion layers 6a. Such extremely thin support material would be bent, folded and ruptured in course of transportation e.g. in a photographic printer.

The glass transition temperature (Tg), herein referred to, is defined as: arithmetic average temperature between the temperature at which a sample film starts being shifted from a base line and the temperature at which the sample film returns to a new base line, measured by a differential thermal analyzer (DSC), while 10 mg of the sample film is heated at a ratio of 20° C./min. in a gas stream of helium and nitrogen. If a peak of heat absorption appears at the glass transition temperature as defined such, the glass transition temperature is regarded as a maximum temperature of the peak of heat absorption.

Diols and dicarboxilic acids for producing polyester having a glass transition temperature between 85 and 200 degrees (more particularly at lowest 90 degrees) are now referred to.

Applicable examples of dicarboxilic acid are: naphthalene dicarboxilic acid, terephthalic acid, isophthalic acid, phthalic acid, phthalic anhydride, succinic acid, glutaric acid, adipic acid, sebacic acid, succinic anhydride, maleic acid, fumaric acid, maleic anhydride, itaconic acid, citraconic anhydride, tetrahydrophthalic anhydride, diphenylene-p,p'-dicarboxilic acid, tetrachlorophthalic anhydride, 3,6-endomethylenetetrahydrophthalic anhydride, and 1,4-cyclohexane dicarboxilic acid.

Applicable examples of diol are: ethylene glycol, 1,3-propanediol, 1,2-propanediol, 1,4-butanediol, 1,5-pentanediol, 1,6-hexanediol, 1,7-heptanediol, 1,8-octanediol, 1,10-decanediol, 1,12-dodecanediol, 1,4-cyclohexanediol, 1,4-cyclohexanedimethanol, 1,3-cyclohexanediol, 1,1-cyclohexanedimethanol, catechol, resorcin, hydroquinone, 1,4-benzenedimethanol, and bisphenol A.

Preferred examples of polyester in use in the present invention are:

PEN: [2,6-naphthalene dicarboxilic acid (NDCA)-/ethylene glycol (EG) (100/100)] of which Tg=119° C.;

PCT: [terephthalic acid (TPA)/cyclohexanedimethanol (CHDM) (100/100)] of which Tg=93° C.; and PAr: [TPA/bisphenol A (BPA) (100/100)] of which Tg=192° C.

In addition to the homopolymer as above but also copolymer of many kinds is applicable. It is natural that the present invention is not limited to the use of the above-described examples of polyester.

Figure 7:
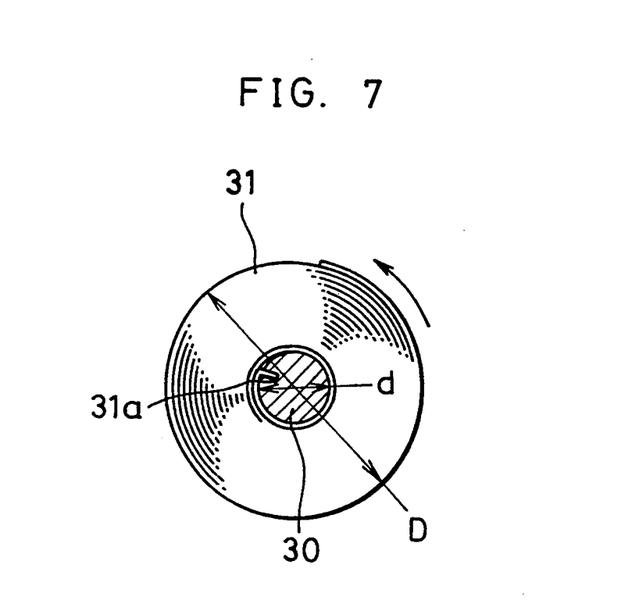
FIG. 7 is an explanatory view, in cross section, illustrating a method of measuring a limit torque upon reverse flexure of a trailer.

In use of the support material 6b of the above PEN, experiments were performed regarding the characteristic of the photo film resistant to reverse flexure, by checking a limit torque at which rotation of the spool with the roll of the photo film starts the trailer of the photo film to flex in reverse to the turns of the roll, as soon as the torque over came the stiffness of the trailer. To measure the limit torque regarding the reverse flexure of the trailer, photo film 31 was wound on a spool 30 as a roll, as illustrated in FIG. 7. A key hole was formed in an axial end of the spool 30, and was engaged with a drive shaft of a torque measuring device. The spool 30 was held in the measuring device, while the roll of the photo film 31 was fixed rotationally. The diameter d of a core of the spool 30 was 7 mm. The maximum diameter D of the roll of the film 31 was 17 mm. When the drive shaft was rotated counterclockwise, the spool 30 was provided with a rotational force in spite of the fixation of the roll of the film 31. Load was applied to a trailer 31a where the photo film 31 was connected to the spool 30. In the course of increase in the load to the trailer 31a, the trailer 31a was eventually flexed and directed in reverse to the turns of the roll. The limit torque was determined by the measuring device upon the start of the reverse flexure.

The measurement was performed under the conditions of the temperature of 32° C. and humidity of 85% RH. The PEN film was varied to have thickness 80, 85 and 90 μm. As a comparable example, polyethylene terephthalate (PET) film was used and had a thickness of 90 μm.

TABLE 1

| Limit Torque | | Thickness (gm) | | |
|---|---|---|---|---|
| (g · cm) | | 80 | 85 | 90 |
| Support | PEN | 760 | 911 | 1082 |
| Material | PET | — | — | 740 |

Note that it is known that application of torque of 900 g·cm or more to the spool is required for stable advancement of the leader from out of the cassette and transportation up to a take-up spool within a camera without being blocked by friction of the inside surfaces. To evaluate the results of the experiments, it is judged that the photo film is inadequate if it had the trailer flexed in reverse upon the application of the torque of 900 g·cm or below.

In view of Table 1, the PEN film having the thickness of 85 μm or lover can be resistant to the leader-advancing torque, even under the high humidity of 85% RH. The PET film must have a greater thickness before the trailer could be prevented from the reverse flexure even under the high humidity.

Figure 8:
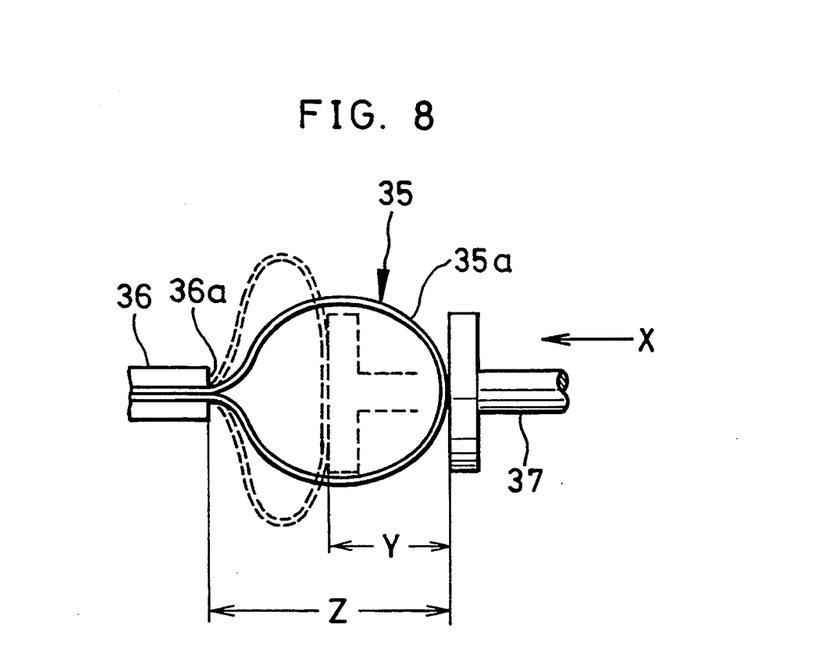
FIG. 8 is an explanatory view, in elevation, illustrating a method of determining loop stiffness.

In use of the support material of those kinds, further experiments were performed regarding the characteristic of the photo film resistant to deformation, by checking a characteristic called "loop stiffness", in the manner illustrated in FIG. 8. In a loop stiffness measuring device, a sample strip 35 of film having a predetermined width, e.g. 35mm, is looped and held on a pair of holder arms 36 of the measuring device. An oval loop 35a of the sample strip 35 is so formed that the loop 35a is projected from ends of the holder arms 36 at a length Z of 50 mm. A pressing arm 37 is so disposed as to place the loop 35a between it and the holder arms 36, and is moved toward the arm 36 and squeeze the loop 35a with the holder arms 36. In response to the deformation of the loop 35a at a length Y which is equal to 25 mm, load X of the pressing arm 37 is determined in grams, as loop stiffness. Note that 24 g or more of the loop stiffness is required for obtaining the film of which the above limit torque of the trailer reverse flexure is 900 g·cm or more.

The measurement of the loop stiffness of the PEN film was performed under the conditions the same in temperature and humidity as the above measurement of the limit torque, in comparison with the PET film.

TABLE 2

| Loop Stiffness | | Thickness (μm) | | |
|---|---|---|---|---|
| (g) | | 80 | 85 | 90 |
| Support | PEN | 20 | 24 | 28 |
| Material | PET | — | — | 22 |

It is understood from Table 2 that the PEN film is highly resistant to deformation in comparison with the PET film, even under high temperature and high humidity. PEN has glass transition temperature of 120° C., sufficiently high in view of practical thermal treatment. The photo film formed with the PEN support material can be finished by the thermal treatment to have high stiffness to not became curled irrecoverably. The, PEN film has high modulus in flexure in particular as mechanical intensity, and if it is 80 μm thick, has the intensity nearly equal to 122 μm-thick triacetyl cellulose (TAC) film conventionally in use for support material of photo film. If the PEN film is 85 μm thick, the intensity of the photo film remains as desired even under the high humidity of 85% RH.

The operation of the novel photo film cassette is described now. In loading a camera with the cassette 2 containing the entirety of the photo film 6, the spool 5 is engaged with a spool drive shaft. Upon inserting the cassette 2 into the camera, the spool drive shaft is rotated, to rotate the spool 5 in the direction of exiting the leader 10. Although the roll 3 has a tendency to loosen, the outermost turn 17 is regulated by the ridges 7 and 8. The rotation of the spool 5 is thus transmitted via the turns of the roll 3 up to the leading end 10a of the leader 10, so as to rotate the spool 5 with the roll 3.

The use of PEN for the support material 6b of the photo film 6 cause the stiffness of the PEN to keep the leading end 10a unstuck on the second outermost turn 18 of the roll 3. In course of rotation of the roll 3 of the photo film 6 with the spool 5, the emulsion surface 20 of the leading end 10a abuts on the separating claw 11a. Further rotation of the spool 5 both rotates the second outermost turn 18 of the roll 3 and advances the leading end 10a apart from the roll 3 and along the port ridge 11 and port rails 15 and 16, so as to come through the passage port 9.

The leading end 10a is passed through the port mouth 9a and exited out of the cassette shell 4. In the camera, the leading end 10a is transported to a film take-up chamber. The photo film 6 is wound on to the take-up spool frame by frame after each exposure. When all imaging frames are exposed on the film, the spool 5 is rotated in the winding direction. The photo film 6 is wound up on the spool 5. At the end of winding the photo film 6 into the cassette shell 4, even the leading end 10a is wound into the cassette shell 4.

Figure 9:
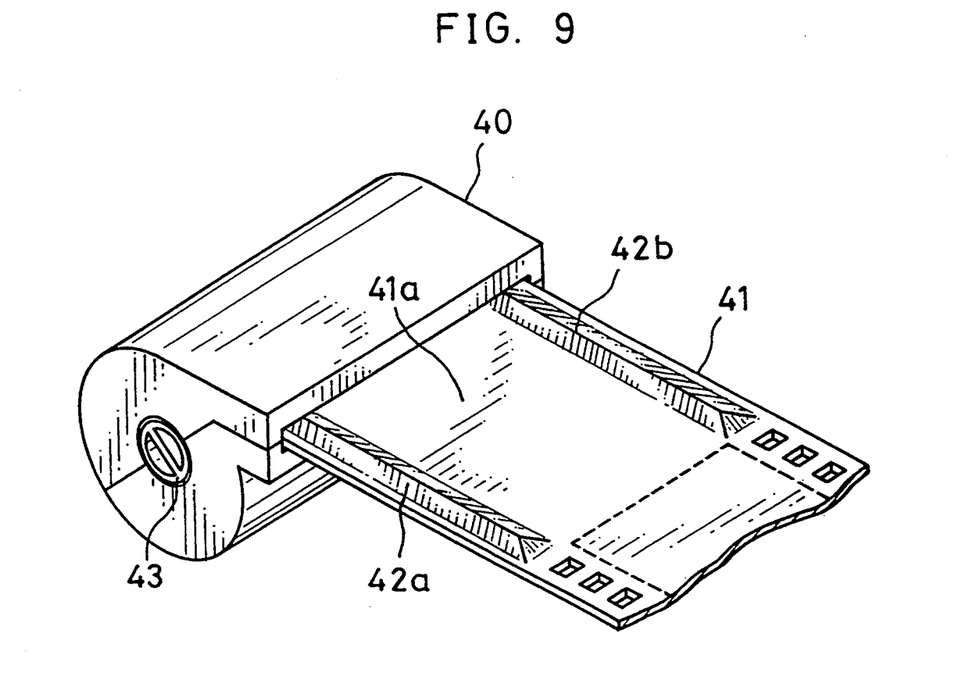
FIG. 9 is a perspective view illustrating another preferred photo film cassette.

FIG. 9 illustrates another preferred photo film cassette according to the present invention. A cassette shell 40 is similar to the above cassette shell 4. Photo film 41 has a trailer 41a, of which a trailing end is secured to a spool 43. Ridges 42a and 42b are projected on the trailer 41a, and directed generally in the longitudinal direction of the photo film 41. The range of forming the ridges 42a and 42b is from 50 to 200 mm as measured from the trailing end toward a leader of the photo film 41. Portions on the emulsion surface opposite to the ridges 42a and 42b have long narrow recesses. The ridges 42a and 42b are adapted to intensification of the trailer 41a, which is thus prevented from flexing in reverse to the turns of roll when the spool is rotated in the unwinding direction, even if the support material of the photo film 41 is not of PEN but of PET.

Figure 10:
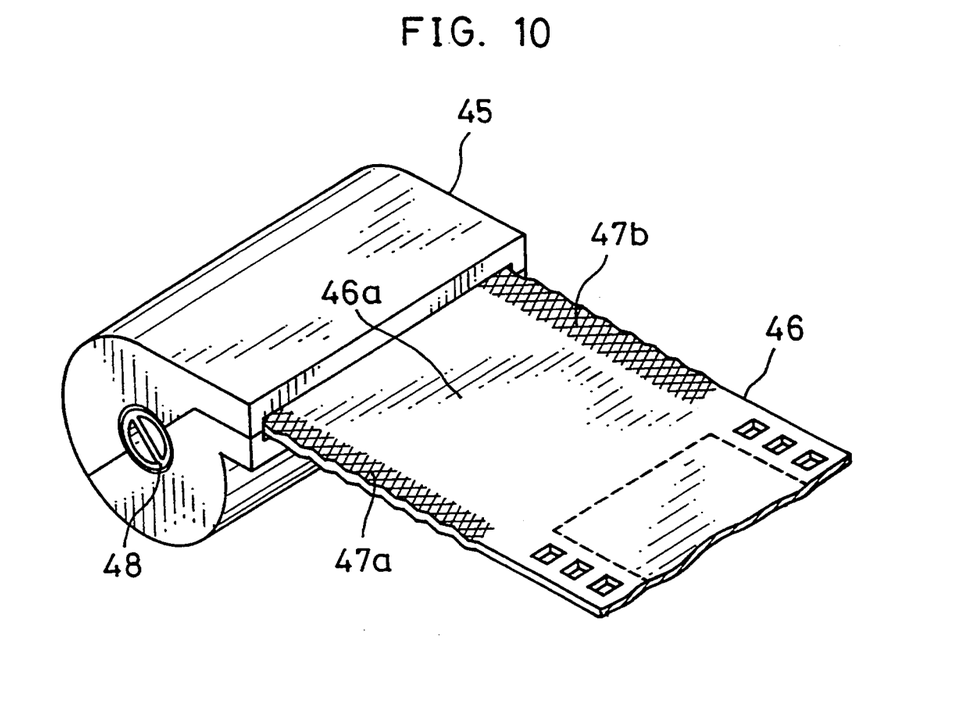
FIGS. 10 and 11 are a perspective view illustrating other photo film cassettes in which friction between a trailer and an overlying turn in the roll is reduced.

FIG. 10 illustrates still another preferred cassette. A cassette shell 45 is similar to the above cassette shell 4 or 40. Photo film 46 has a trailer 46a, of which a trailing end is secured to a spool 48. Embossed patterns 47a and 47b, constituted of protrusions and retractions, are formed on the trailer 46a. The range of forming the embossed patterns 47a and 47b is from 50 to 200 mm from the trailing end toward a leader. The embossed patterns 47a and 47b are adapted to avoidance of high friction of both surfaces 19 and 20 of the trailer 46a and thus prevention of the trailer 46a from being tightly stuck on the turns of the roll of the photo film 46 overlying the trailer 46a, in particular under high humidity. It follows that the trailer 46a is prevented from flexing in reverse to the turns of roll when the spool is rotated in the unwinding direction.

Note that the "embossed" construction in use in accordance with the present invention refers to providing surfaces of the plastic film with lattice patterns, corrugation, fibrous patterns, silk-finished patterns, fine grained patterns and the like. To emboss surfaces, there are generally two available systems: roll embossing in which embossing rolls are used, and flat plate embossing in which embossing plates are used. The former includes embossing by use of a roulette device.

Figure 11:
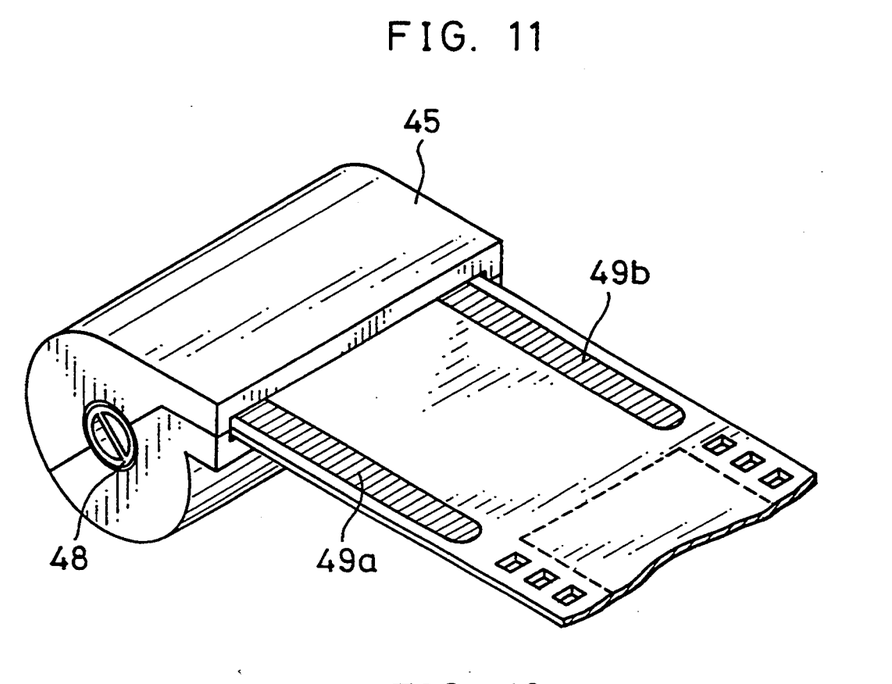

The operation of the construction illustrated in FIG. 9 can be achieved also by that illustrated in FIG. 11. A trailer is provided with coating layers 49a and 49b which are both lubricant and impermeable to water. The coating layers 49a and 49b are formed along both lengthwise edges of the trailer, but can be formed further on both surfaces of the trailer, or on the entirety of the back surface of the trailer. The coating layers 49a and 49b are laminated by combination of latex such as vinylidene chloride for the lubricant characteristic, and fluoro type surface-active agent such as coat of polytetrafluoroethylene for the water-impermeable characteristic.

The embossed patterns 47a and 47b or the coating layers 49a and 49b cause the trailer 46a to have a small coefficient of friction between turns of the roll of the photo film 46, namely between the back surface 19 and the emulsion surface 20: to be precise, a friction coefficient of 0.30 or below that the friction coefficient between turns of the roll of photo film with a PET support is 0.32 to 0.36 under high humidity of 85% RH. The friction coefficient of the trailer reduced to 0.30 or below is advantageous in preventing the trailer from flexing in reverse to the turns of roll when the spool is rotated in the unwinding direction, because the turns including the trailer will not be stuck together tightly even with much moisture.

Tests were carried out. A camera was loaded With each novel cassettes according to the embodiments above. The spool was rotated so as to exit the leader out of the cassette shell. A comparable example in use in the tests contained photo film of PET support being 90 μm thick. Rates of success in which it was possible to engage the leader with a take-up spool of the camera are shown in Table 3:

TABLE 3

|  | Conditions | | |
| --- | --- | --- | --- |
| Success Rate (%) | 23° C., 60% RH | 23° C., 85% RH | 32° C., 85% RH |
| PET 90 μm (Comparable) | 100 | 90 | 50 |
| PEN 90 μm | 100 | 100 | 100 |
| Ridges | 100 | 100 | 100 |
| Embossing | 100 | 100 | 100 |
| Coating | 100 | 100 | 100 |

It follows that the preferred embodiments can operate reliably as success was achieved at the rate of 100% to engage the leader with a take-up spool of the camera, even under the high humidity of 85% RH, whilst the comparable example having the PET support was only reliable at the rate of 50%.

Note that, to exit the leader out of the cassette shell in response to rotation of the spool, the cassette in the preferred embodiments above has leader-advancing construction, which is constituted of the ridges 7 and 8 for regulating the outermost turn of the roll 3 of the photo film and the single separating claw 11a for separating the leading end 10a from the second outermost turn 18. The present invention is however applicable to cassettes having different leader-advancing constructions. For example, a spool in a cassette can have flanges around which circumferential lips are formed to project for contact with edges of the outermost turn of the roll, in order to prevent the outermost turn from loosening by utilizing the elasticity of resin forming the flanges; a cassette can have a plurality of means for separating the leading end from the roll; and a cassette can have an openable shutter member formed of opaque resin and disposed at a passage port instead of plush for shielding the inside of the cassette shell from ambient light.

Although PEN is preferably used in the above embodiments for the support material of the photo film, also PcT, PAr, and other polymer of many kinds are applicable as having physical characteristics similar to PEN. Preferable characteristics of preferred polyester film are such that the glass transition temperature is from 85° C. to 200° C., desirably 90° C. to 200° C., that the thickness is from 40 to 100 μm, and that the film is finished by thermal treatment at temperature between 50° C. and the glass transition temperature of the film.

The use of the preferred polyester as support material 6b of the photo film makes it possible to set the support material 6b to be 40 to 100 μm thick. This is advantageous in minimizing the size of the cassette shell, and enlarging the maximum number of photographable frames on the strip of the photo film to be contained in the cassette shell, in comparison with a conventional 135-type photo film cassette of which a cassette shell has an inner diameter of 23.5 mm and which contains a photo film having a length of at most 36 photographable frames. Maximum frame numbers and inner diameters of cassette shells are shown in Table 4:

TABLE 4

| Maximum Frame Number (Exposures) | 20 | 40 | 60 | 80 | 100 |
|---|---|---|---|---|---|
| Inner Diameter (mm) | 14.4 | 17.6 | 20.3 | 22.7 | 24.8 |

Note that the correlated data in Table 4 is estimated in adaptation to such sizes that: (1) the entirety of the photo film is 100 μm thick inclusive of the support material 6b of PEN; (2) the photo film as exposed is to be transported frame by frame at an amount of 38 mm as 135-type photo film; (3) the sum of respective lengths of the leader and the trailer of the photo film out of use for exposure is 260 mm; (4) a core of the spool is 7 mm across; and (5) the maximum diameter of the roll of the photo film is smaller than the inner diameter of the cassette shell, by an amount of 0.5 mm.

It is concluded from the above description that, as the photo film can be thinned due to the preferable polyester for the support material 6b with great stiffness, the photo film can be elongated to have 12 to 120 photographable frames even for a conventional cassette shell having an inner diameter of 23.5 mm. Although the conventional photo film cassette contains only photo film of a length ranging from 12 to 36 photographable frames, the cassette according to the present invention can contain photo film of a length ranging from 12 to 130 frames. Novel photo film to be contained in the cassette can have 40 to 120 frames, desirably 48 to 130 frames, and most preferably 50 to 100 frames. This enlargement in the number of the photographable frames of the photo film is favorable with respect to reduction in cost of manufacturing cassette shells and spools, reduction in expense of packaging photo film cassettes, e.g. for wrapping material enclosing cassettes, decorative cases, and cardboard packages, and reduction in recycling of photo film cassettes.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A photo film cassette including a cassette shell in which a photo film passage port is formed, and a spool rotatably contained in said cassette shell for winding photo film as a roll, said photo film having a leading end which, when said spool is rotated in a direction of unwinding said photo film, is exited through said passage port, said photo film comprising:

at least one photosensitive emulsion layer; and support material for supporting said photosensitive emulsion layer, said support material having a loop stiffness of at least 24 grams as measured under a condition of temperature of 32° C. and humidity of 85% RH, where said loop stiffness is defined as a load applied to a loop of a sample strip having a predetermined width until said loop is pressed down to a predetermined amount, said loop is formed by looping said strip while overlaying together two portions of one surface of said strip, said load directed toward said two overlain portions.

2. A photo film cassette as defined in claim 1, wherein 130 or fewer imaging frames are photographable on said photo film.

3. A photo film cassette as defined in claim 2, wherein said support material is of polyester having a glass transition temperature which is from 90° to 200° C., and a thickness which is from 85 to 100 μm, and which is thermally treated at temperature between 50° C. and said glass transition temperature.

4. A photo film cassette as defined in claim 3, wherein said polyester comprises polyethylene naphthalate.

* * * * *